(12) United States Patent
Yu

(10) Patent No.: US 9,087,256 B2
(45) Date of Patent: Jul. 21, 2015

(54) DYNAMIC IMAGE PROCESSING METHOD AND SYSTEM FOR PROCESSING VEHICULAR IMAGE

(71) Applicant: Avisonic Technology Corporation, Hsin-Chu (TW)

(72) Inventor: Chi-Chang Yu, Keelung (TW)

(73) Assignee: Avisonic Technology Corporation, Science-Based Industrial Park, Hsin-Chu (TW)

( * ) Notice: Subject to any disclaimer, the term of this patent is extended or adjusted under 35 U.S.C. 154(b) by 173 days.

(21) Appl. No.: 13/783,418

(22) Filed: Mar. 4, 2013

(65) Prior Publication Data

US 2014/0112597 A1  Apr. 24, 2014

(30) Foreign Application Priority Data

Oct. 23, 2012 (TW) .............................. 101139088 A

(51) Int. Cl.
| | | |
|---|---|---|
| *G06K 9/32* | (2006.01) | |
| *H04N 7/18* | (2006.01) | |
| *G06T 3/40* | (2006.01) | |
| *B60R 1/00* | (2006.01) | |

(52) U.S. Cl.
CPC ... *G06K 9/32* (2013.01); *B60R 1/00* (2013.01); *G06T 3/4038* (2013.01); *H04N 7/18* (2013.01); *B60R 2300/607* (2013.01)

(58) Field of Classification Search
USPC .................... 382/104, 154, 294; 348/47, 187
See application file for complete search history.

(56) References Cited

U.S. PATENT DOCUMENTS

| | | | |
|---|---|---|---|
| 6,236,748 B1 * | 5/2001 | Iijima et al. | .................. 382/154 |
| 7,145,519 B2 | 12/2006 | Takahashi | |
| 7,684,593 B2 | 3/2010 | Chinomi | |
| 7,969,326 B2 | 6/2011 | Sakakibara | |
| 8,130,271 B2 | 3/2012 | Imamura | |
| 8,155,385 B2 | 4/2012 | Mizuta | |
| 8,503,729 B2 | 8/2013 | Kumagai | |
| 2008/0181488 A1 | 7/2008 | Ishii | |
| 2012/0127312 A1 | 5/2012 | Nagamine | |

FOREIGN PATENT DOCUMENTS

| | | |
|---|---|---|
| CN | 101167104 A | 4/2008 |
| CN | 101844545 A | 9/2010 |
| JP | 200227448 A | 1/2002 |
| JP | 2002166802 A | 6/2002 |
| JP | 2006121587 A | 5/2006 |
| JP | 200736668 A | 2/2007 |
| JP | 200741791 A | 2/2007 |
| JP | 200789081 A | 4/2007 |
| JP | 3971783 B2 | 9/2007 |
| JP | 20087090 A | 1/2008 |
| JP | 200848317 A | 2/2008 |
| JP | 200849889 A | 3/2008 |

(Continued)

*Primary Examiner* — Duy M Dang
(74) *Attorney, Agent, or Firm* — Winston Hsu; Scott Margo

(57) ABSTRACT

A dynamic image processing method includes: providing a plurality of first images; synthesizing the first images to generate a second image; selecting a plurality of calibration points on the second image; performing a geometric transformation upon the first images; performing the geometric transformation upon the calibration points to generate a plurality of transformed calibration points; and generating at least one image characteristic boundary according to the transformed calibration points.

9 Claims, 11 Drawing Sheets

(56) References Cited

FOREIGN PATENT DOCUMENTS

| | | |
|---|---|---|
| JP | 2008187564 A | 8/2008 |
| JP | 4164703 B2 | 10/2008 |
| JP | 2009100095 A | 5/2009 |
| JP | 2009151524 A | 7/2009 |
| JP | 2012174152 A | 9/2012 |
| KR | 100948886 B1 | 3/2010 |
| KR | 101354068 B1 | 1/2014 |
| TW | 201005676 | 2/2010 |

* cited by examiner

DYNAMIC IMAGE PROCESSING METHOD AND SYSTEM FOR PROCESSING VEHICULAR IMAGE

BACKGROUND OF THE INVENTION

1. Field of the Invention

The disclosed embodiments of the present invention relate to vehicular image processing, and more particularly, to a dynamic image processing method for processing a vehicular image by defining calibration points on the vehicular image.

2. Description of the Prior Art

An around view monitor system (AVMS) provides an around view monitor (AVM) image/bird's-eye view image around a vehicle, which enables the driver to monitor the surrounding conditions of the vehicle in real time. A vehicle having an AVMS may be equipped with a plurality of image capturing devices (e.g. cameras) to capture a plurality of vehicle-surrounding images. The vehicle-surrounding images are processed by an image operation including image stitching to generate an AVM image, wherein a vehicle image may be attached to the AVM image to generate a vehicular image. As the vehicular image/AVM image is usually a top-view image (i.e. the viewing angle is fixed), image stitching lines corresponding to the vehicle-surrounding images on the vehicular image/AVM image are fixed. In order to provide a more compact scene around the vehicle for the driver, the vehicular image/AVM image should be viewed from different viewing angles, which implies that the image stitching lines need to be adjusted accordingly.

Thus, an image processing method capable of providing dynamically adjustable image stitching lines is needed to meet the requirement of viewing the vehicular image/AVM image from different viewing angles.

SUMMARY OF THE INVENTION

It is therefore an objective of the present invention to provide a dynamic image processing method for processing a vehicular image by defining calibration point(s) on the vehicular image and a related dynamic image processing system which meet the above requirements.

According to an embodiment of the present invention, an exemplary vehicular image processing method is disclosed. The exemplary vehicular image processing method comprises the following steps: providing a plurality of first images; synthesizing the first images to generate a second image; selecting a plurality of calibration points on the second image; performing a geometric transformation upon the first images; performing the geometric transformation upon the calibration points to generate a plurality of transformed calibration points; and generating at least one image characteristic boundary according to the transformed calibration points.

According to an embodiment of the present invention, an exemplary dynamic image processing system is disclosed. The exemplary dynamic image processing system comprises a processing unit and a storage unit. The processing unit is arranged for performing a synthesis operation or a geometric transformation upon a plurality of first images, and selecting a plurality of calibration points on a second image to generate calibration point information, wherein the second image is generated after the synthesis operation is performed upon the first images. The storage unit is coupled to the processing unit, and is arranged for storing the calibration point information. When the processing unit is arranged to perform the geometric transformation upon the first images, the processing unit is arranged to perform the identical geometric transformation upon the calibration points to generate a plurality of transformed calibration points, and generate at least one image characteristic boundary according to the transformed calibration points.

The proposed dynamic image processing method defines calibration points on a vehicular image, wherein an image characteristic boundary generated from the calibration points may be adjusted according to the display setting of the vehicular image. Therefore, when the image characteristic boundary is used as an image stitching line/warning line/parking line, a dynamic image stitching line/warning line/parking line can be realized, which meets the driver's/user's requirement of viewing the vehicular image/AVM image from different viewing angles.

These and other objectives of the present invention will no doubt become obvious to those of ordinary skill in the art after reading the following detailed description of the preferred embodiment that is illustrated in the various figures and drawings.

DETAILED DESCRIPTION

The concept of the present invention is to define a plurality of calibration points on a vehicular image/AVM image, and adjust positions of the calibration points on the display accordingly when a display of the vehicular image is changed (e.g. the display is zoomed-in, the viewing angle of the display is changed, or other display setting(s) are changed). In other words, there is a correspondence between the positions of the calibration points on the display and a current display setting of the vehicular image (e.g. a normal display mode, a zoom-in display mode or other display modes). The correspondence may be used to realize many applications related to the vehicular image processing.

Figure 1:
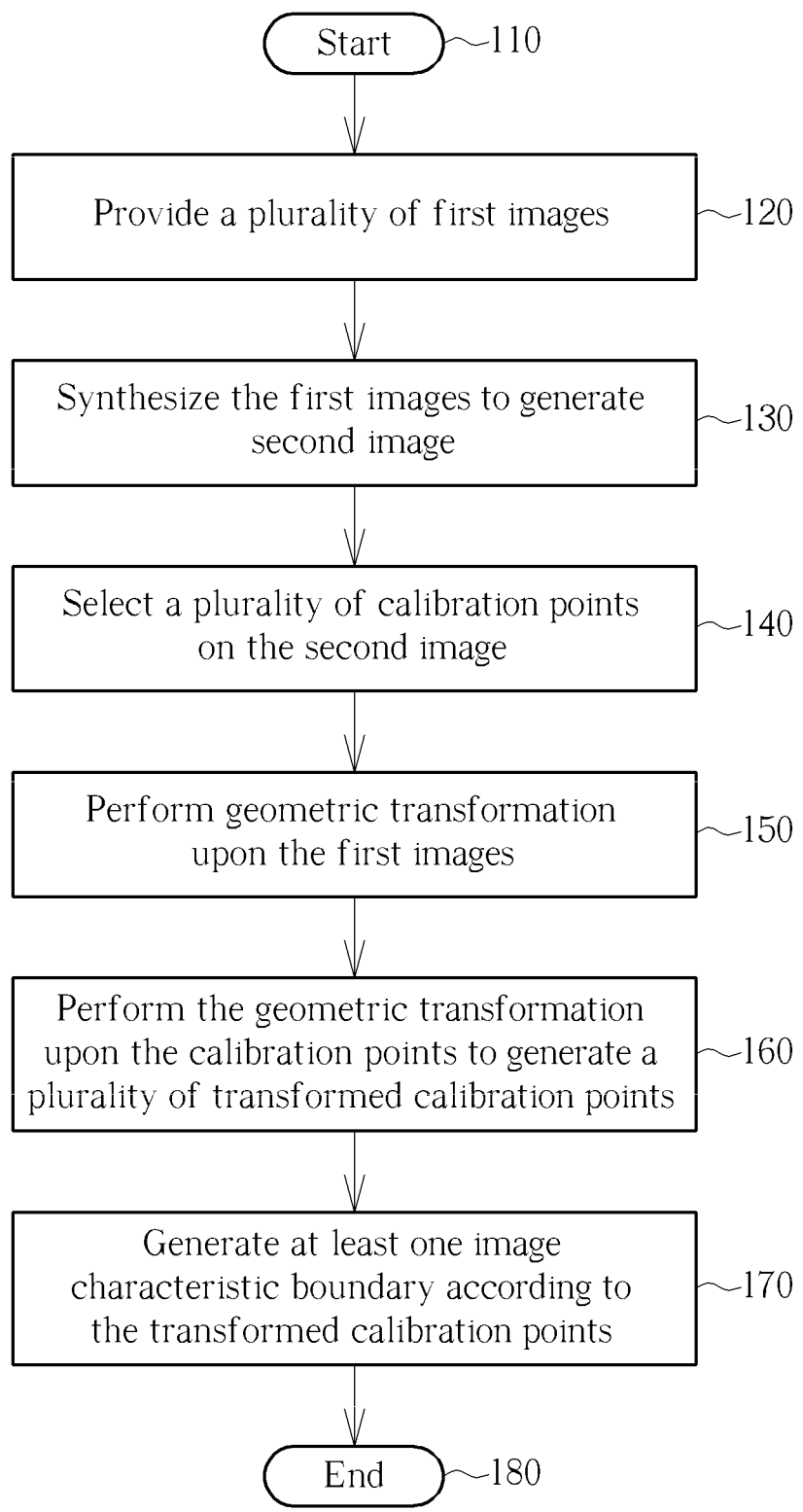
FIG. 1 is an exemplary generalized dynamic image processing method according to an embodiment of the present invention.

Please refer to FIG. 1, which is an exemplary generalized dynamic image processing method according to an embodiment of the present invention. Provided the result is substantially the same, the steps are not required to be executed in the exact order shown in FIG. 1. The method may be summarized as follows.

Step 110: Start.
Step 120: Provide a plurality of first images.
Step 130: Synthesize the first images to generate a second image.
Step 140: Select a plurality of calibration points on the second image.
Step 150: Perform a geometric transformation upon the first images to generate a plurality of transformed first images.
Step 160: Perform the geometric transformation upon the calibration points to generate a plurality of transformed calibration points.
Step 170: Generate at least one image characteristic boundary according to the transformed calibration points.
Step 180: End.

In a case where the method is employed in an AVMS, the first images may be a plurality of corrected images/top-view images, and the second image may be an AVM image. Specifically, a plurality of sub-images (e.g. distorted wide-angle images) may be received first, and then an image correction (e.g. wide-angle distortion correction and top-view transformation) may be performed upon the sub-images to generate the corrected images/top-view images, respectively. The corrected images/top-view images may be synthesized as the AVM image.

As shown in steps 140-160, the selected calibration points and the first images are processed by the identical geometric transformation, wherein the geometric transformation may be a rotation operation, a shifting operation, a magnification operation, a minimization operation, a tilt operation or a viewing angle changing operation. In a case where the at least one image characteristic boundary is at least one image stitching line, another second image may be generated according to the at least one image stitching line and the transformed first images. Therefore, a dynamic image stitching line, whose location is changed according to the image viewing angle, is realized to meet the requirements of viewing the vehicular image/AVM image from different viewing angles. Additionally, the at least one image characteristic boundary may be used as a vehicle warning line/area for enhancing the driving security or a dynamic parking line for assisting parking, or used in other applications related to the vehicular image processing. As long as a dynamic image processing method is provided by referring to the correspondence between calibration points defined on an image and current display setting of the image, it obeys the spirit of the present invention. Further description is detailed as follows.

Figure 2:
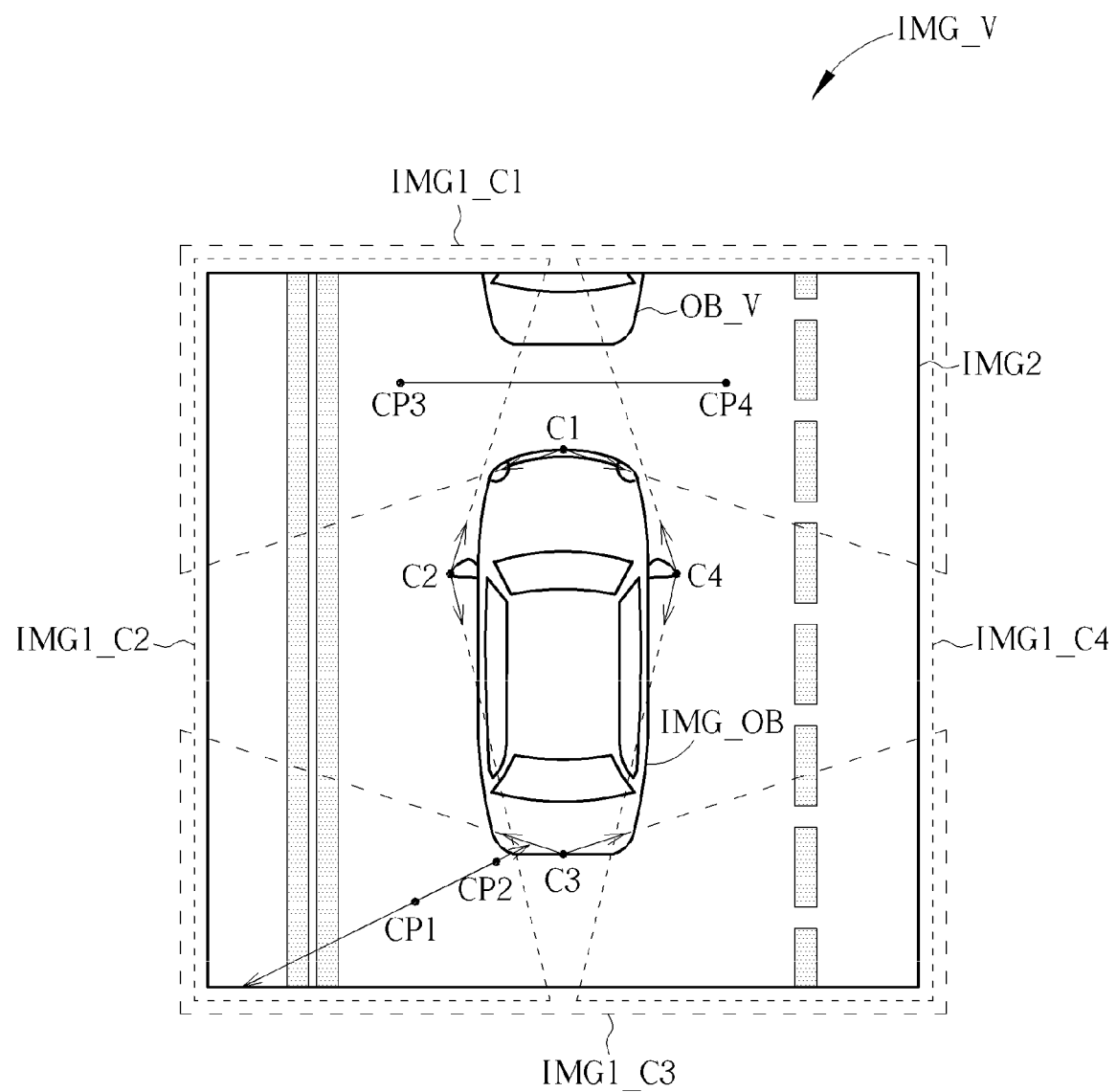
FIG. 2 is a diagram illustrating exemplary image characteristic boundaries defined on a vehicular image according to an embodiment of the present invention.

Please refer to FIG. 2, which is a diagram illustrating exemplary image characteristic boundaries defined on the vehicular image IMG_V according to an embodiment of the present invention. Firstly, four image capturing devices C1-C4 disposed on the vehicle (represented by an object image IMG_OB) may receive a plurality of sub-images (i.e. distorted wide-angle images corresponding to surroundings of the vehicle), and an image correction (i.e. wide-angle distortion correction and top-view transformation) may be performed upon the sub-images to generate a plurality of first images (i.e. top-view images) IMG1_C1-IMG1_C4, respectively. Next, the first images IMG1_C1-IMG1_C4 may be synthesized as a second image IMG2 (i.e. an AVM image). Finally, the object image IMG_OB may be attached to the second image IMG2 to generate the vehicular image IMG_V.

As shown in FIG. 2, there is a plurality of overlapping regions between the first images IMG1_C1-IMG1_C4. To avoid ghost images or discontinuities being generated in the overlapping regions, appropriate image stitching lines are needed to stitch the overlapping images. A plurality of calibration points CP1 and CP2 may be selected on an overlapping region of the second image IMG2, which is formed between two adjacent first images IMG1_C2 and IMG1_C3. An image characteristic boundary may be generated according to the calibration points CP1 and CP2, and accordingly used as an image stitching line (i.e. a ray passing through the calibration points CP1 and CP2). Positions of the calibration points CP1 and CP2 (or a location of the image stitching line) may be preset by the vehicular image system of the vehicle, or selected based on the user's/driver's requirements.

In a case where the calibration points are used as dynamic image stitching line(s), the calibration points, besides being selected on the overlapping regions, may also be selected by referring to the predetermined image stitching line. Please refer to FIG. 3, which is a diagram illustrating exemplary image stitching lines generated from selecting a plurality of calibration points on the vehicular image IMG_V shown in FIG. 2 according to an embodiment of the present invention. Firstly, a predetermined image stitching operation may be performed upon the first images IMG1_C1-IMG1_C4 to generate predetermined image stitching lines (e.g. a predetermined image stitching line SL0). Next, by referring to the generated predetermined image stitching lines, a plurality of calibration points may be selected to generate desired image stitching lines. The following description uses the first image IMG1_C1 and the first image IMG1_C2 to illustrate one exemplary image stitching.

Figure 3:
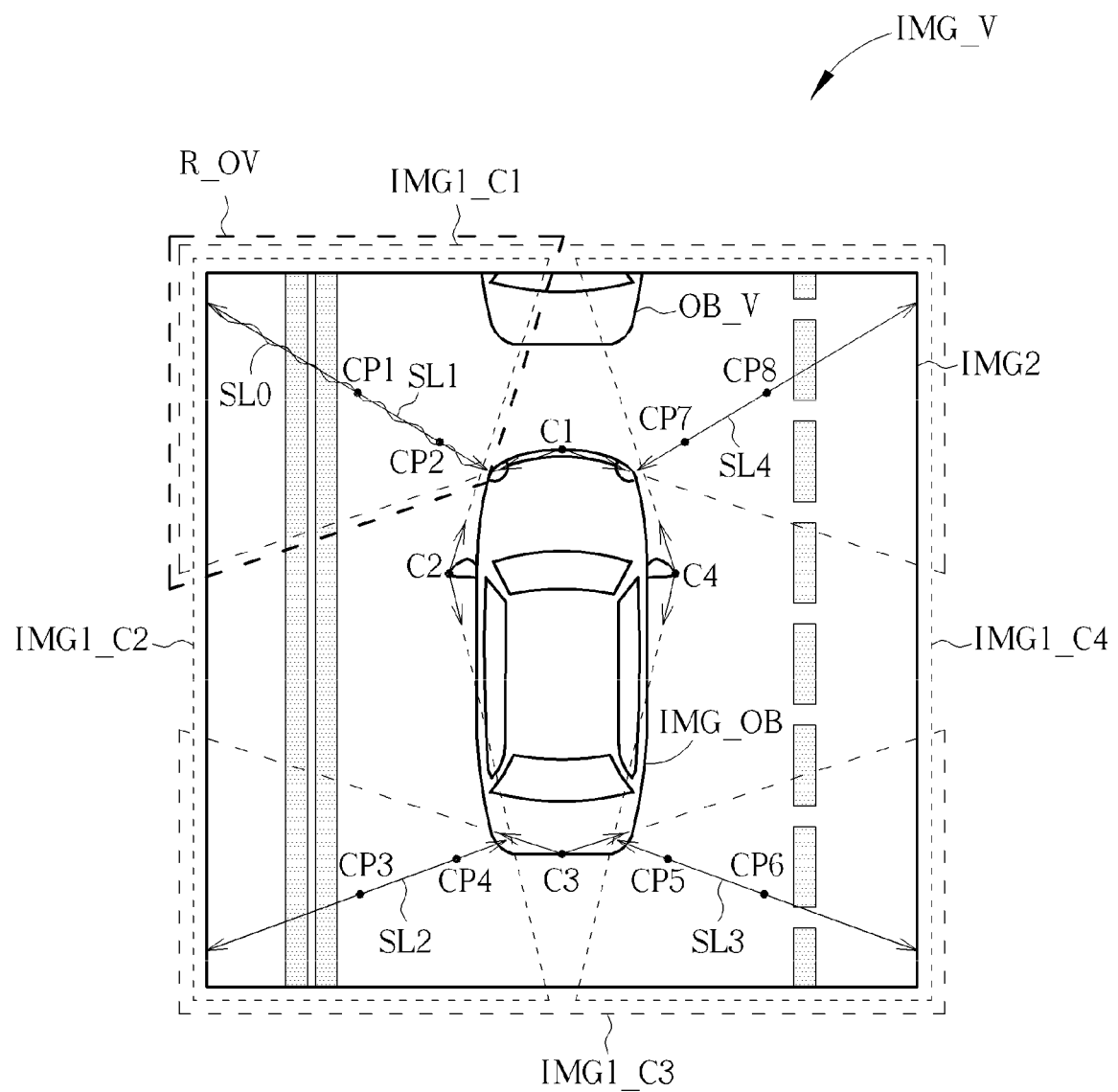
FIG. 3 is a diagram illustrating exemplary image stitching lines generated from selecting a plurality of calibration points on the vehicular image shown in FIG. 2 according to an embodiment of the present invention.
Figure 4:
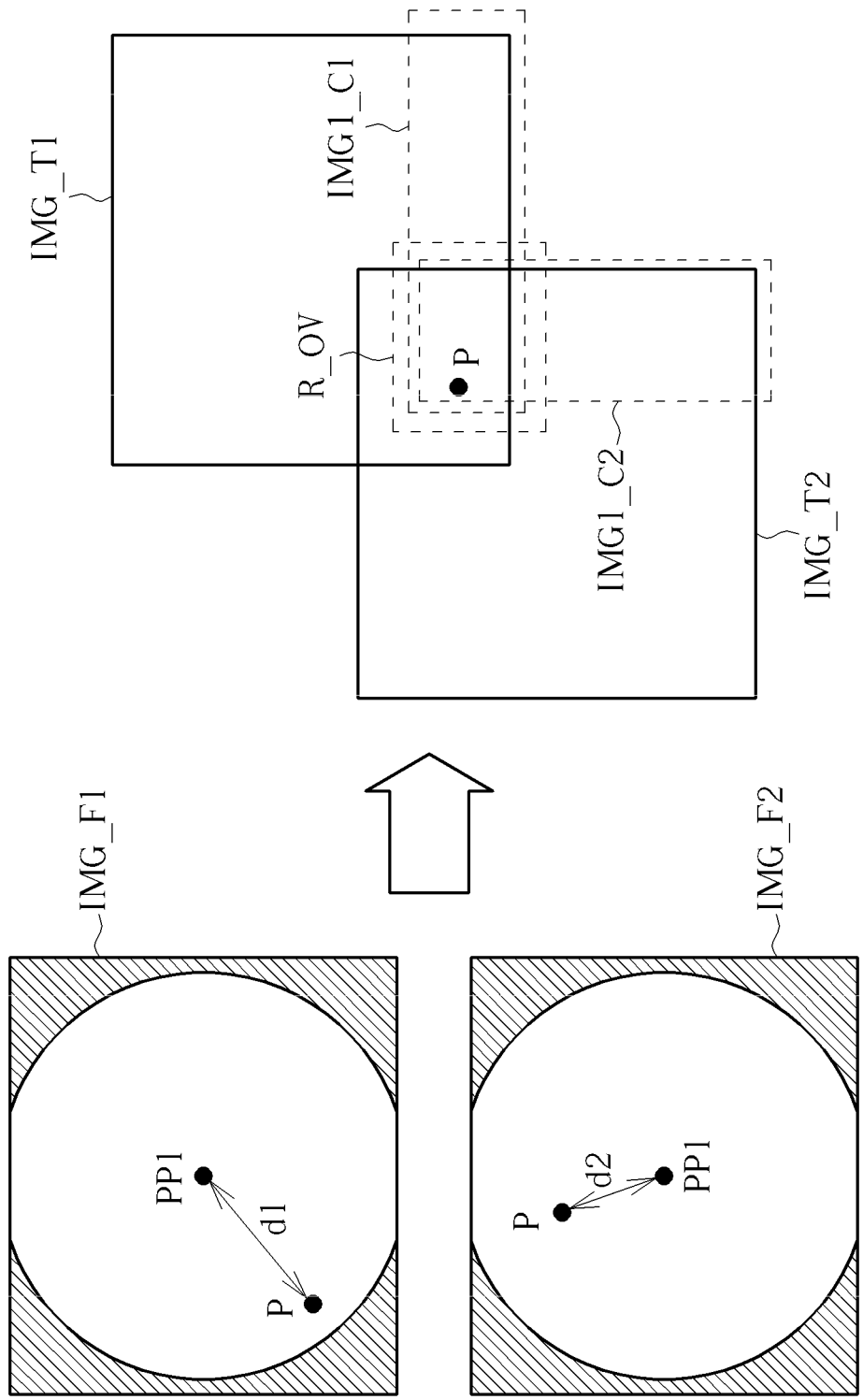
FIG. 4 is a diagram illustrating the stitching of first images shown in FIG. 3 according to an embodiment of the present invention.

Please refer to FIG. 4, which is a diagram illustrating the stitching of the first image IMG1_C1 and the first image IMG1_C2 shown in FIG. 3 according to an embodiment of the present invention. A distorted wide-angle image IMG_F1 is a sub-image captured by the image capturing device C1, and a distorted wide-angle image IMG_F2 is a sub-image captured by the image capturing device C2. A top-view image IMG_T1 is generated by performing a wide-angle distortion correction and top-view transformation upon the distorted wide-angle image IMG_F1, and a top-view image IMG_T2 is generated by performing a wide-angle distortion correction and top-view transformation upon the distorted wide-angle image IMG_F2. The first image IMG1_C1 is actually a portion of the top-view image IMG_T1, and the first image IMG1_C2 is actually a portion of the top-view image IMG_T2.

In this embodiment, the first image IMG1_C1 overlaps the first image IMG1_C2 at an overlapping region R_OV. In order to stitch the first image IMG1_C1 and the first image IMG1_C2, pixel data of each pixel in the overlapping region R_OV needs to be determined. For example, to determine pixel data corresponding to a pixel P in the second image IMG2 in FIG. 3, a distance d1 between the pixel P and a predetermined pixel PP1 (i.e. a pixel corresponding to the optical center of the wide-angle lens) of the distorted wide-angle image IMG_F1 may be compared with a distance d2 between the pixel P and a predetermined pixel PP2 (i.e. a pixel corresponding to the optical center of the wide-angle lens) of the distorted wide-angle image IMG_F2. Next, either the pixel data corresponding to the pixel P in the first image IMG1_C1 or the pixel data corresponding to the pixel P in the first image IMG1_C2 may be selected as the pixel data corresponding to the pixel P in the second image IMG2. As shown in FIG. 4, the distance d2 is shorter than the distance d1. It is known that when a pixel is closer to a center of a distorted wide-angle image, the corresponding image distortion is lower. Therefore, the pixel data corresponding to the pixel P in the first image IMG1_C2 may be selected as the pixel data corresponding to the pixel P in the second image IMG2 shown in FIG. 3.

Please refer to FIG. 3 again. After determining pixel data of each pixel in the overlapping region R_OV, the predetermined image stitching line SL0 may be generated by referring to a correspondence between each pixel data in the overlapping region R_OV and the first image IMG1_C1 as well as a correspondence between each pixel data in the overlapping region R_OV and the first image IMG1_C2. Specifically, as all pixel data located at the right side of the predetermined image stitching line SL0 (in the overlapping region R_OV) correspond to the first image IMG1_C1, and all pixel data located at the left side of the predetermined image stitching line SL0 (in the overlapping region R_OV) correspond to the first image IMG1_C2, the predetermined image stitching line SL0 may be regarded as a pixel data boundary. In other words, the predetermined image stitching line SL0 is used as an image stitching line for stitching the first image IMG1_C1 and the first image IMG1_C2. In an alternative design, as the predetermined image stitching line SL0 is a curve (but not limited therein), numerical computations (e.g. linear least square fitting) may be employed to obtain an approximate line (e.g. another predetermined image stitching line SL1). After obtaining the predetermined image stitching line SL0/SL1, a plurality of calibration points CP1 and CP2 may be selected to generate the desired image stitching line by referring to the predetermined image stitching line SL0/SL1. In addition, the predetermined image stitching line SL1 obtained from the linear approximation may be selected directly as the image stitching line for the follow-up image stitching.

Based on the exemplary implementation of the image stitching line generation described above, a plurality of calibration points CP3-CP8 and a plurality of predetermined image stitching lines SL2-SL4 may be obtained. By referring to the predetermined image stitching lines SL1-SL4 directly, another AVM image may be generated by synthesizing a plurality of images received afterward by the image capturing devices C1-C4. Please note that the aforementioned implementation of the image stitching line generation is for illustrative purposes only, and is not meant to be a limitation of the present invention. For example, an image stitching line may be generated by selecting a plurality of calibration points according to the driver's viewing preferences rather than a predetermined image stitching line. In addition, the provided image stitching line is not limited to a straight line. In other words, it is also feasible to select more than three calibration points to generate a bending image stitching line.

Figure 5:
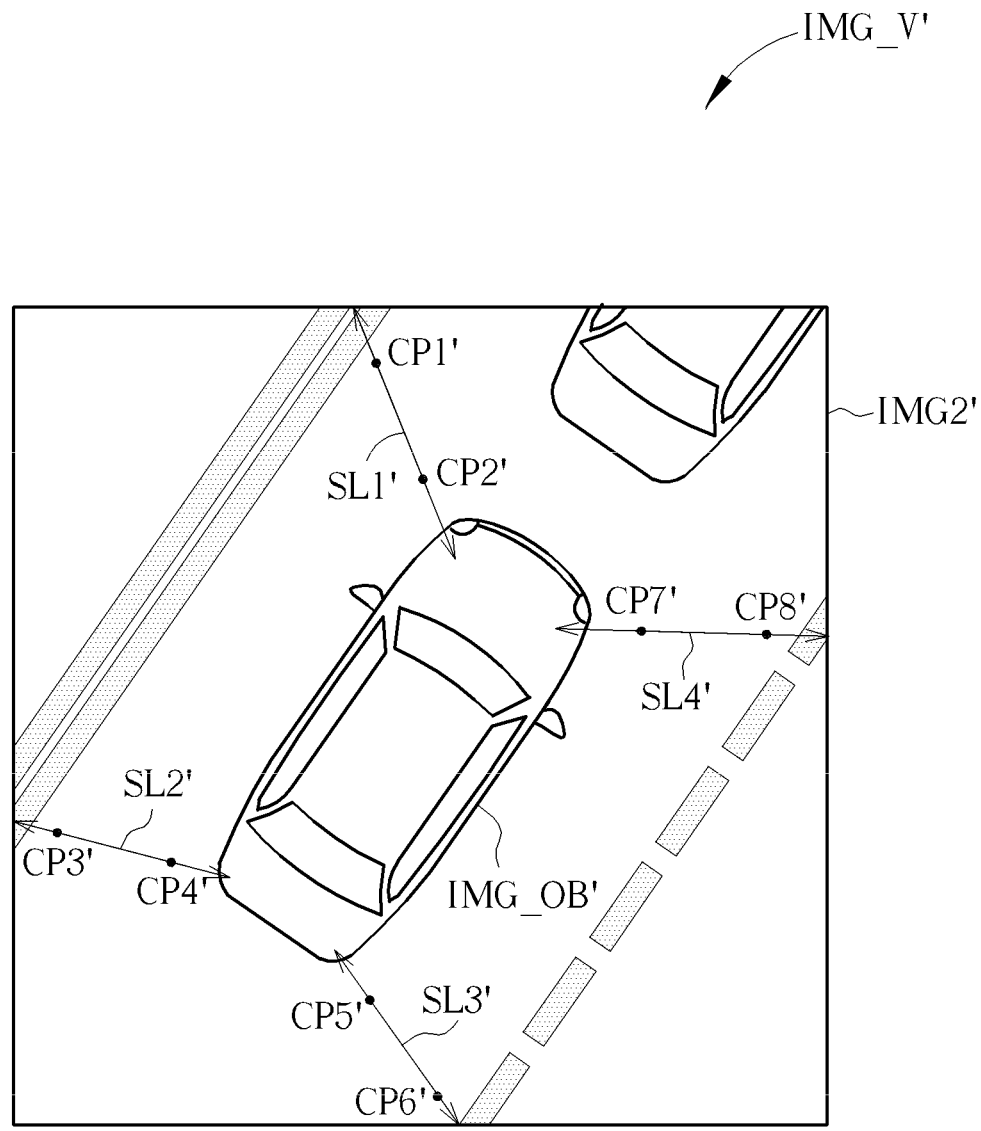
FIG. 5 is a diagram illustrating an exemplary changed display of the vehicular image shown in FIG. 3 after a geometric transformation according to an embodiment of the present invention.

As positions of the selected calibration points on the display correspond to the current display setting of the vehicular image, the positions of the selected calibration points (or the image stitching lines) are adjusted accordingly when the display setting of the vehicular image is changed. Please refer to FIG. 5, which is a diagram illustrating an exemplary changed display of the vehicular image IMG_V shown in FIG. 3 after a geometric transformation according to an embodiment of the present invention. The vehicular image IMG_V' shown in FIG. 5 (including an object image IMG_OB' and a second image IMG2') may be regarded as an image generated by rotating the vehicular image IMG_V shown in FIG. 3 (including the object image IMG_OB and the second image IMG2) in a clockwise direction. The calibration points CP1'-CP8' shown in FIG. 5 are generated by performing the same rotation operation upon the calibration points CP1-CP8 shown in FIG. 3. In other words, the relative positions of the calibration points CP1'-CP8' relative to image objects of the vehicular image IMG_V' are identical to those of the calibration points CP1-CP8 relative to image objects of the vehicular image IMG_V. Therefore, image stitching lines SL1'-SL4' (generated according to the calibration points CP1'-CP8') may be regarded as image stitching lines generated by performing the identical rotation operation upon the image stitching lines SL1-SL4.

Figure 6:
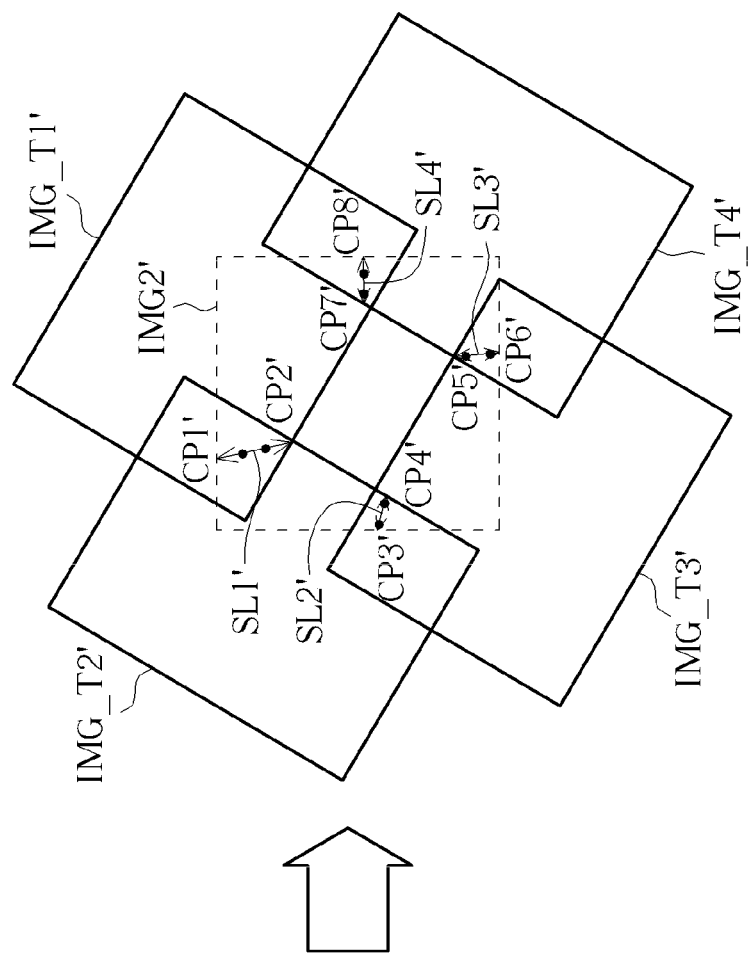
FIG. 6 is a diagram illustrating the generation of the second image shown in FIG. 5 according to an embodiment of the present invention.
Figure 6:
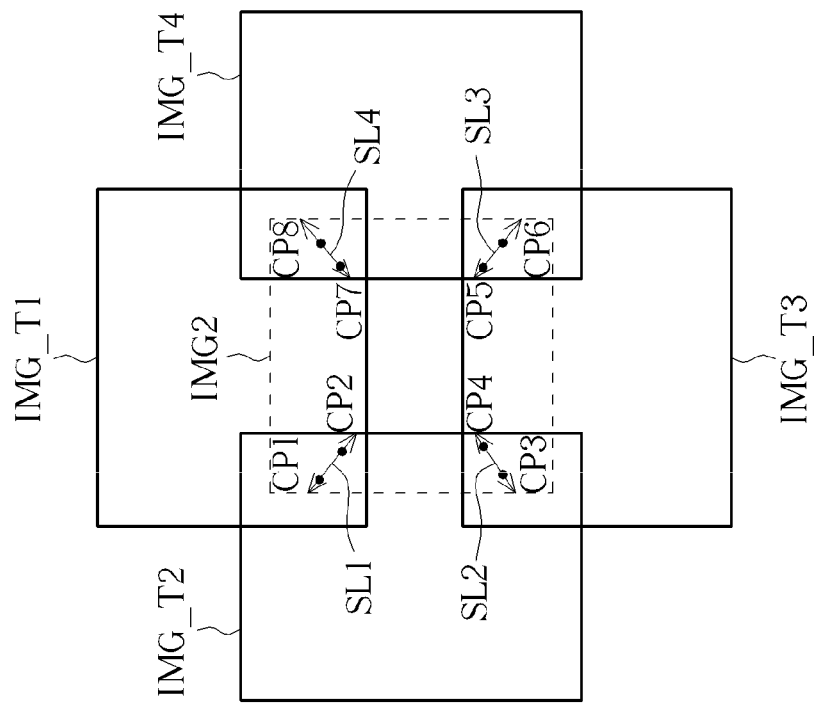

It should be noted that, in this embodiment, the vehicular image IMG_V' is not generated by performing the rotation operation directly upon the vehicular image IMG_V shown in FIG. 3. Please refer to FIG. 3, FIG. 5 and FIG. 6 together. FIG. 6 is a diagram illustrating the generation of the second image IMG2' shown in FIG. 5 according to an embodiment of the present invention. The second image IMG2 shown in FIG. 3 is synthesized by the top-view images IMG_T1-IMG_T4 shown in FIG. 6, wherein the first images IMG1_C1-IMG1_C4 are a portion of the top-view images IMG_T1-IMG_T4, respectively. As shown in FIG. 6, performing a rotation operation upon the vehicular image IMG_V shown in FIG. 3 actually means performing the rotation operation upon the top-view images IMG_T1-IMG_T4 to generate the top-view images IMG_T1'-IMG_T4', and performing the rotation operation upon the calibration points CP1-CP8 to generate the calibration points CP1'-CP8'. In addition, the object image IMG_OB' in FIG. 5 is generated by performing the rotation operation upon the object image IMG_OB in FIG. 3. Next, the second image IMG2' may be generated by synthesizing the top-view images IMG_T1'-IMG_T4' according to image stitching lines SL1'-SL4' (generated from the calibration points CP1'-CP8') and corresponding output locations of the top-view images IMG_T1'-IMG_T4'. Finally, as shown in FIG. 5, the object image IMG_OB' is attached to the second image IMG2' to generate the vehicular image IMG_V'.

As shown in FIG. 5, the user may obtain more driving information (e.g. a vehicle roof of a preceding vehicle) from the display of the second image IMG2' after the aforementioned rotation operation is performed. In an alternative design, it is also feasible to perform the rotation operation directly upon the image stitching lines SL1-SL4 in FIG. 6 to form the image stitching lines SL1'-SL4'. Please note that, besides the rotation operation, a person skilled in the art should readily understand that the aforementioned geometric transformation may also include magnification, minimization, shifting and other related two-dimensional transformations.

Figure 7:
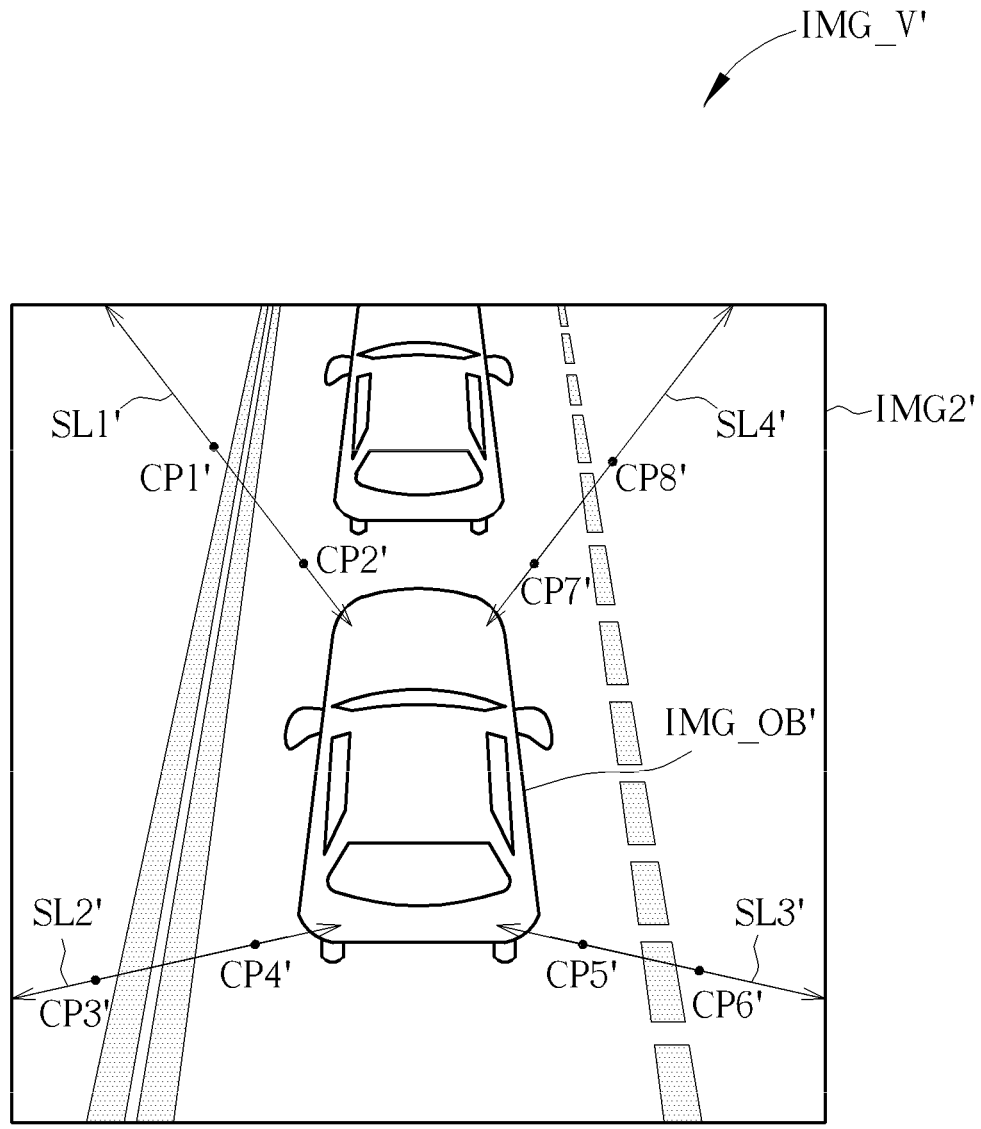
FIG. 7 is a diagram illustrating an exemplary changed display of the vehicular image shown in FIG. 3 after a geometric transformation according to another embodiment of the present invention.

Before top-view images are synthesized to generate an AVM image, a geometric transformation is performed. Therefore, the proposed image processing method may be employed in three-dimensional transformations for changing the vehicular image display. Please refer to FIG. 7, which is a diagram illustrating an exemplary changed display of the vehicular image IMG_V shown in FIG. 3 after a geometric transformation according to another embodiment of the present invention. The vehicular image IMG_V' shown in FIG. 7 may be regarded as an image generated by tilting (i.e.

changing the viewing angle) the vehicular image IMG_V shown in FIG. 3. The calibration points CP1'-CP8' shown in FIG. 7 are generated by performing the identical tilt operation upon the calibration points CP1-CP8 shown in FIG. 3. As a person skilled in the art can readily understand the detailed operation of the generation of the vehicular image IMG_V' shown in FIG. 7 after reading the description directed to FIG. 5, further description is omitted here for brevity.

The proposed vehicular image processing method may also provide a driving security mechanism to warn the driver to maintain a safe distance from the preceding vehicle. Please refer to FIG. 2 again. In FIG. 2, there is a vehicle (represented by the vehicle object OB_V) located in front of the driver. A plurality of calibration points CP3 and CP4 may be selected on the second image IMG2. By referring to the calibration points CP3 and CP4, an image characteristic boundary may be generated between the vehicle object OB_V and the object image IMG_OB as a warning line (i.e. a line segment having endpoints CP3 and CP4). The positions of the calibration points CP3 and CP4 (or a location of the warning line) may be preset by the vehicular image system, or selected based on the user's/driver's requirements.

Figure 8:
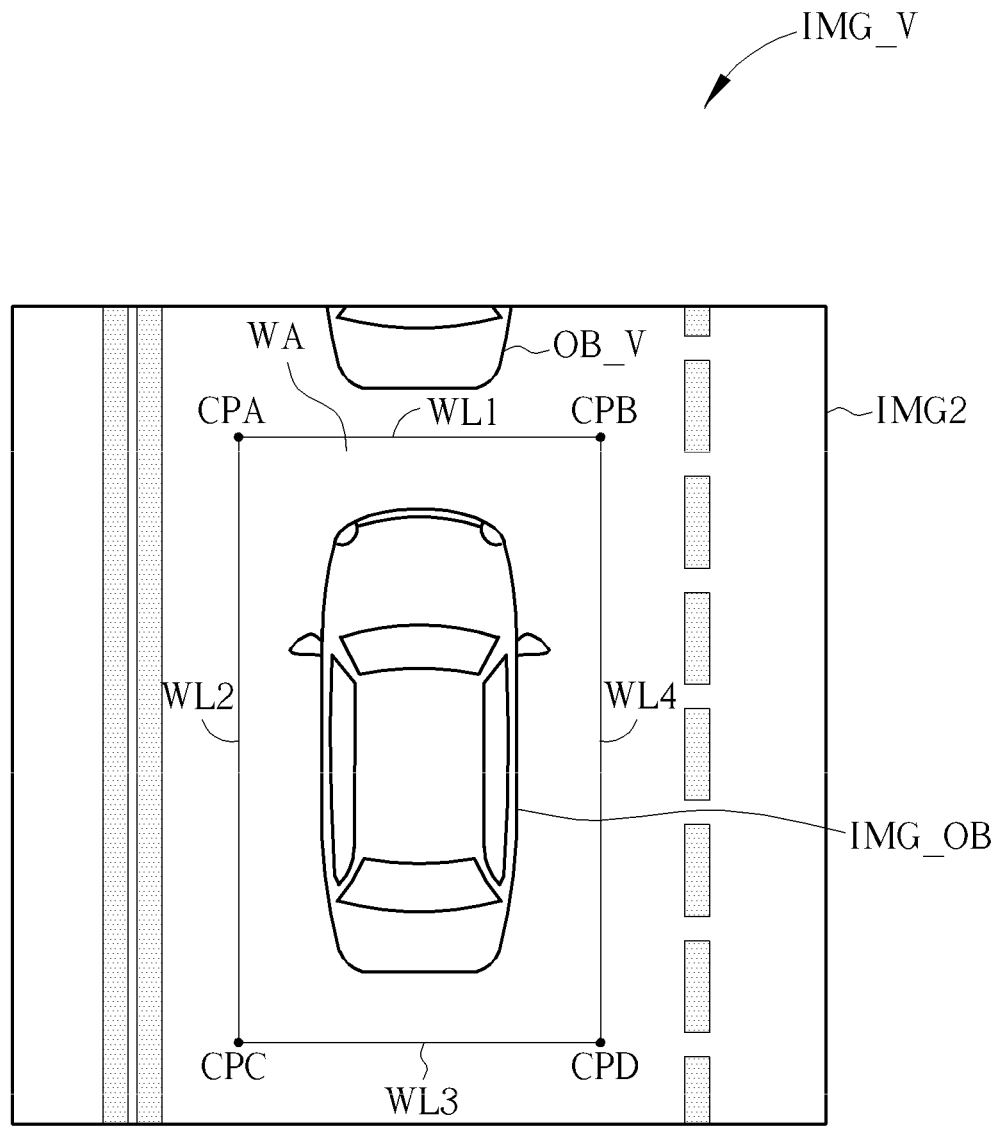
FIG. 8 is a diagram illustrating exemplary warning lines generated by selecting a plurality of calibration points on the vehicular image shown in FIG. 2 according to an embodiment of the present invention.

Please refer to FIG. 8, which is a diagram illustrating exemplary warning lines generated by selecting a plurality of calibration points on the vehicular image IMG_V shown in FIG. 2 according to an embodiment of the present invention. As there is a vehicle (represented by the vehicle object OB_V) located in front of the driver, the following description uses the warning line between the vehicle object OB_V and the object image IMG_OB to illustrate one exemplary warning line selection.

First, a plurality of calibration points CPA and CPB may be selected according to the location of the object image IMG_OB on the second image IMG2. For example, the calibration points CPA and CPB may be located at a distance of one-third of the vehicle length from the vehicle's front end of the object image IMG_OB, and a warning line WL1 is generated accordingly. In an alternative design, the location of the warning line WL1 may be adjusted according to the vehicle speed and the location of the object image IMG_OB on the second image IMG2. Specifically, when the vehicle speed increases, the warning line WL1 is farther away from the object image IMG_OB (i.e. closer to the vehicle object OB_V) to ensure a safe distance for high speed driving. Once the vehicle object OB_V passes the warning line WL1 on the display of the vehicular image IMG_V, the vehicular image system may generate a warning signal to warn the driver. In addition, a plurality of calibration points CPC and CPD may also be selected to generate a plurality of warning lines WL2-WL4 according to the location of the object image IMG_OB on the second image IMG2 and/or distances between the object image IMG_OB and surrounding objects thereof. In this embodiment, the warning lines WL1-WL4 may form a warning area WA.

Please note that the above is for illustrative purposes only, and is not meant to be a limitation of the present invention. For example, at least one warning line may be generated by selecting at least two calibration points directly according to the driver's requirements. A warning area may also be generated by selecting calibration points without determining warning lines in advance. Additionally, the provided warning line(s) is not limited to straight line(s). It is also feasible to select more than three calibration points to generate a bending warning line. In other words, the shape of the provided warning area may be adjusted based on the user's requirements.

Figure 9:
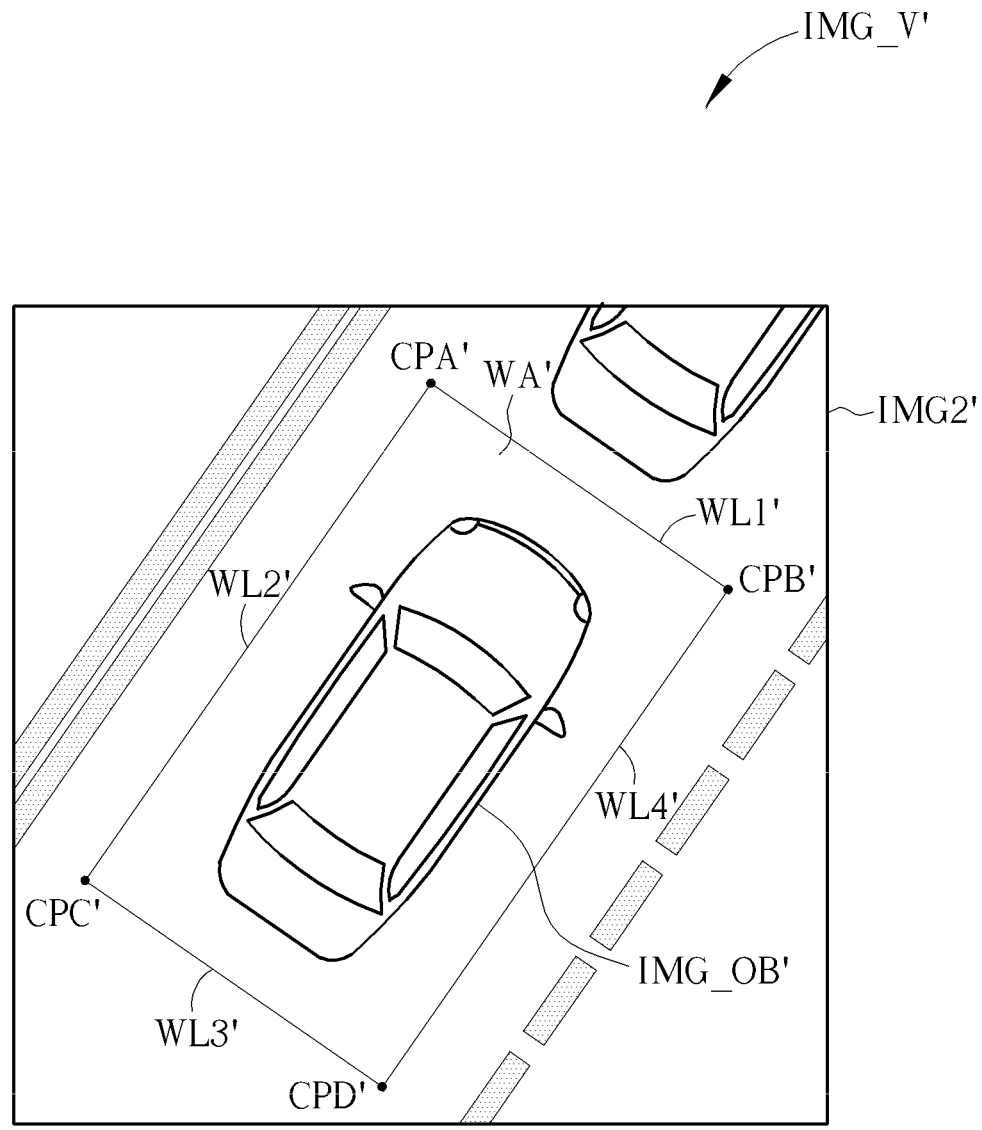
FIG. 9 is a diagram illustrating an exemplary changed display of the vehicular image shown in FIG. 8 after a geometric transformation according to an embodiment of the present invention.

When the display setting of the vehicular image is changed, the positions of the selected calibration points (or the warning lines) on the display are adjusted accordingly. Please refer to FIG. 9, which is a diagram illustrating an exemplary changed display of the vehicular image IMG_V shown in FIG. 8 after a geometric transformation according to an embodiment of the present invention. The vehicular image IMG_V' shown in FIG. 9 (including an object image IMG_OB' and a second image IMG2') may be regarded as an image generated by rotating the vehicular image IMG_V shown in FIG. 8 in a clockwise direction. The calibration points CPA'-CPD' shown in FIG. 9 are generated by performing an identical rotation operation upon the calibration points CPA-CPD shown in FIG. 8. In other words, the relative positions of the calibration points CPA'-CPD' relative to image objects of the vehicular image IMG_V' are identical to those of the calibration points CPA-CPD relative to image objects of the vehicular image IMG_V. Therefore, warning lines WL1'-WL4' (generated according to the calibration points CPA'-CPD') may be regarded as warning lines generated by performing the identical rotation operation upon the warning lines WL1-WL4. In addition, the warning area WA' (generated according to the warning lines WL1'-WL4') may also be regarded as a warning area generated by performing the rotation operation upon the warning area WA. In this way, the excellent driving security can be maintained even under different display settings. Please note that, besides the rotation operation, a person skilled in the art should readily understand that the aforementioned geometric transformation may also include magnification, minimization, shifting and other related two-dimensional transformations.

Figure 10:
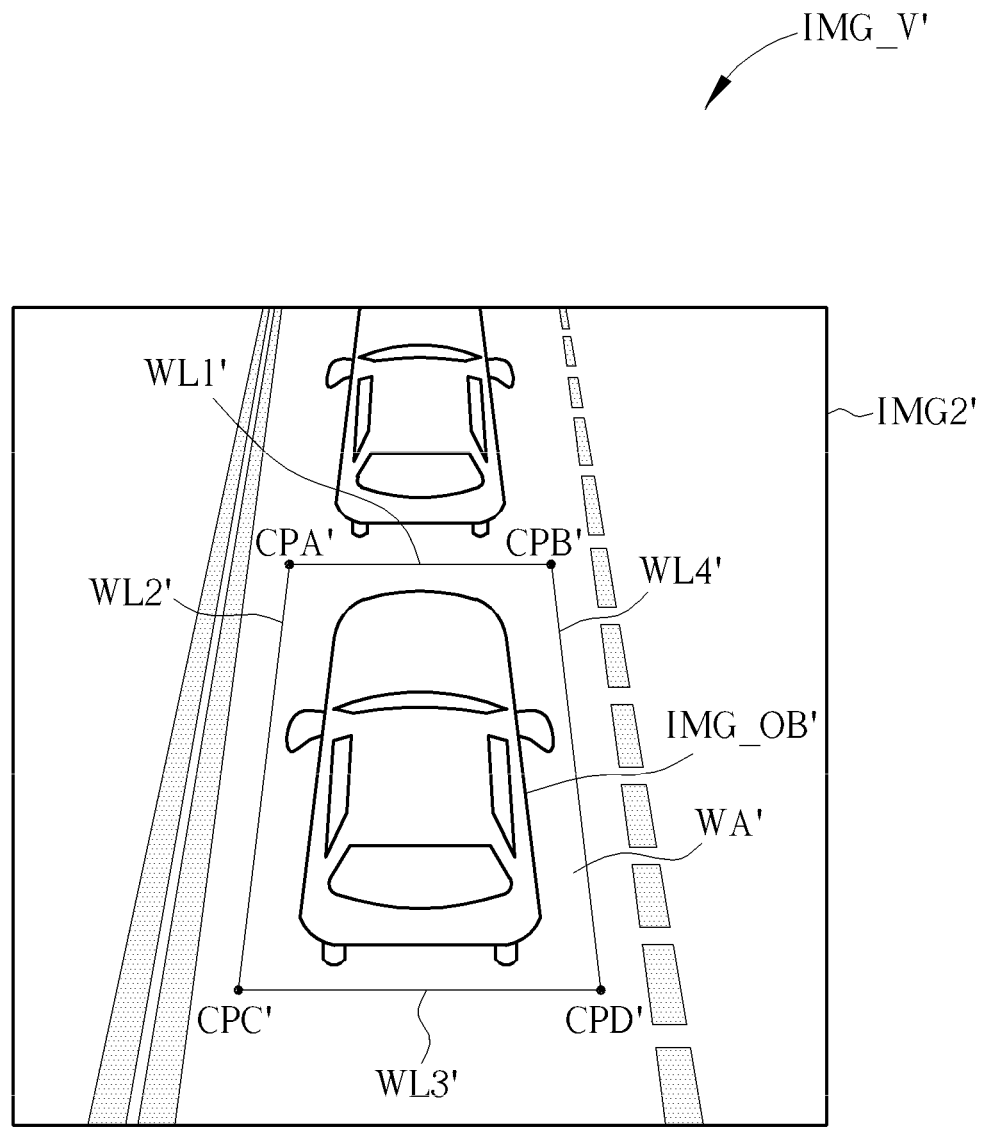
FIG. 10 is a diagram illustrating an exemplary changed display of the vehicular image shown in FIG. 8 after a geometric transformation according to another embodiment of the present invention.

The proposed image processing method may be employed in three-dimensional transformations for changing the vehicular image display. Please refer to FIG. 10, which is a diagram illustrating an exemplary changed display of the vehicular image IMG_V shown in FIG. 8 after a geometric transformation according to another embodiment of the present invention. The vehicular image IMG_V' shown in FIG. 10 may be regarded as an image generated by tilting (i.e. changing the viewing angle) the vehicular image IMG_V shown in FIG. 8. The calibration points CPA'-CPD' shown in FIG. 10 are generated by performing an identical tilt operation upon the calibration points CPA-CPD shown in FIG. 8. As a person skilled in the art can readily understand the detailed operation of the generation of the vehicular image IMG_V' shown in FIG. 10 after reading the description directed to FIG. 9, further description is omitted here for brevity.

In brief, supposing that the display setting of the vehicular image IMG_V shown in FIG. 3/FIG. 8 is a normal display mode, the display setting of the vehicular image IMG_V' shown in FIG. 5/FIG. 9 may be a rotation mode, and the display setting of the vehicular image IMG_V' shown in FIG. 7/FIG. 10 may be a tilt mode, wherein the positions of the calibration points may be adjusted according to the current display setting of the vehicular image IMG_V. In other words, the dynamic image stitching lines and dynamic warning lines, which may be adjusted according to the display mode, are provided. Additionally, the concept of the present invention is not limited to be employed in the image stitching lines and warning lines only. In one implementation, appropriate calibration points may be selected to generate tangent lines at two lateral sides of the object image IMG_OB shown in FIG. 2, and the generated tangent lines may be used as dynamic assisting parking lines. In another implementation, appropriate calibration points may be selected to generate a mask region for removing an image therein or replacing the image by a desired image.

Figure 11:
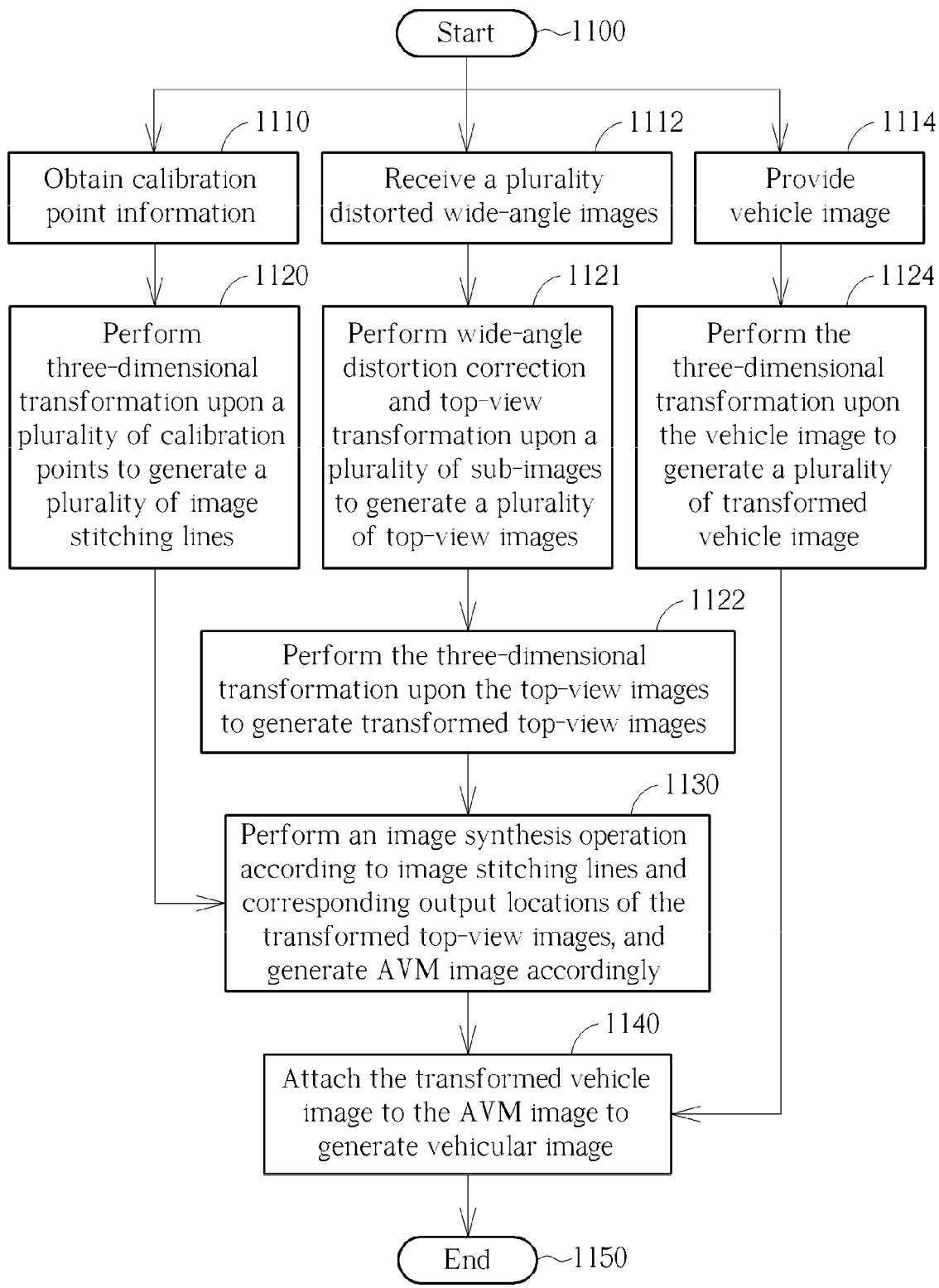
FIG. 11 is a flow chart illustrating an exemplary dynamic image processing method employed in dynamic image stitching according to an embodiment of the present invention.

Please refer to FIG. 11, which is a flow chart illustrating an exemplary dynamic image processing method employed in dynamic image stitching according to an embodiment of the present invention. Provided the results are substantially the same, the steps are not required to be executed in the exact order shown in FIG. 11. The method may be summarized as follows.

Step 1100: Start.
Step 1110: Obtain calibration point information.
Step 1112: Receive a plurality distorted wide-angle images.
Step 1114: Provide a vehicle image.
Step 1120: Perform a three-dimensional transformation upon a plurality of calibration points to generate a plurality of image stitching lines.
Step 1121: Perform a wide-angle distortion correction and top-view transformation upon a plurality of sub-images to generate a plurality of top-view images.
Step 1122: Perform the three-dimensional transformation upon the top-view images to generate a plurality of transformed top-view images.
Step 1124: Perform the three-dimensional transformation upon the vehicle image to generate a transformed vehicle image.
Step 1130: Perform an image synthesis operation according to image stitching lines and corresponding output locations of the transformed top-view images, and generate an AVM image accordingly.
Step 1140: Attach the transformed vehicle image to the AVM image to generate a vehicular image.
Step 1150: End.

Before the image synthesis operation, the calibration points have been selected and stored in a vehicular image system. Therefore, in step 1110, the calibration point information may be obtained directly for further image stitching. In steps 1120, 1122 and 1124, the calibration points, the top-view images and the vehicle image are processed by the identical three-dimensional transformation. As a person skilled in the art can readily understand the detailed operation of each step shown in FIG. 11 after reading the description directed to FIGS. 1-7, further description is omitted here for brevity. It should be noted that a plurality of image characteristic boundaries may be provided on a vehicular image for different applications. For example, a dynamic image stitching line, a dynamic warning line and/or a dynamic parking line may be defined simultaneously on a vehicular image.

To sum up, the proposed dynamic image processing method defines calibration points on a vehicular image, wherein an image characteristic boundary generated from the calibration points may be adjusted according to the display setting of the vehicular image. Therefore, when the image characteristic boundary is used as an image stitching line/warning line/parking line, a dynamic image stitching line/warning line/parking line can be realized, which meets the driver's/user's requirement of viewing the vehicular image/AVM image from different viewing angles.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic image processing method, comprising:
providing a plurality of first images;
synthesizing the first images to generate a second image;
selecting a plurality of calibration points on the synthesized second image;
performing a same geometric transformation upon the first images, wherein the geometric transformation is one of a rotation operation, a shifting operation, a magnification operation, a minimization operation, a tilt operation and a viewing angle changing operation;
performing the geometric transformation upon the calibration points to generate a plurality of transformed calibration points; and
generating at least one image characteristic boundary according to the transformed calibration points.

2. The dynamic image processing method of claim 1, wherein the at least one image characteristic boundary is at least one image stitching line, and the method further comprises:
synthesizing the geometrically transformed first images according to the at least one image stitching line, and accordingly generating the geometrically transformed second image.

3. The dynamic image processing method of claim 2, wherein the second image comprises at least one overlapping region between the adjacent first images, and the selected calibration points are located in the at least one overlapping region.

4. The dynamic image processing method of claim 1, wherein the at least one image characteristic boundary is at least one warning line.

5. The dynamic image processing method of claim 4, wherein the second image comprises an object image; the at least one warning line is located around the object image of the second image; and the at least one warning line is used to determine if any object passes the at least one warning line and approaches the object image.

6. The dynamic image processing method of claim 1, wherein the step of providing the first images comprises:
receiving a plurality of sub-images; and
performing an image correction upon the sub-images to generate the first images, respectively.

7. The dynamic image processing method of claim 1, wherein the step of synthesizing the first images to generate the second image comprises:
obtaining an image stitching line from an overlapping region between the adjacent first images.

8. The dynamic image processing method of claim 7, wherein the step of selecting the calibration points on the synthesized second image comprises:
selecting the calibration points on the image stitching line.

9. A dynamic image processing system, comprising:
a processing unit, for performing a synthesis operation or a geometric transformation upon a same plurality of first images, and selecting a plurality of calibration points on a second image to generate calibration point information, wherein the second image is generated after the synthesis operation is performed upon the first images; and
a storage unit, coupled to the processing unit, for storing the calibration point information;
wherein when the processing unit is arranged to perform the geometric transformation upon the first images, the processing unit is arranged to perform the geometric transformation upon the calibration points to generate a plurality of transformed calibration points, and generate at least one image characteristic boundary according to the transformed calibration points; and the geometric transformation is one of a rotation operation, a shifting operation, a magnification operation, a minimization operation, a tilt operation and a viewing angle changing operation.

* * * * *